July 17, 1928.
O. H. GOETZ
1,677,765
AUTOMOBILE FENDER GUARD
Filed Oct. 5, 1925
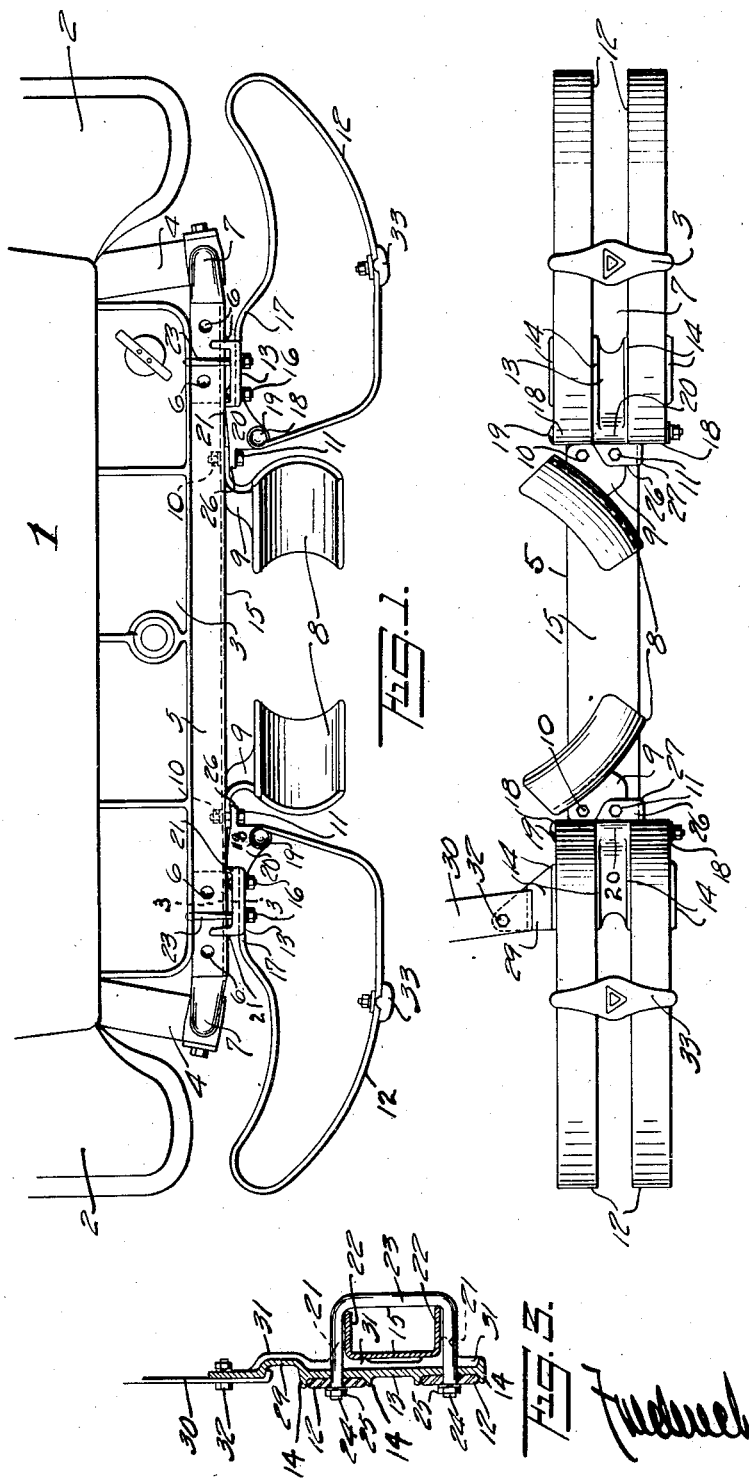
INVENTOR
Oscar H. Goetz
BY
ATTORNEY Patented July 17, 1928.

1,677,765

UNITED STATES PATENT OFFICE.

OSCAR H. GOETZ, OF SPRINGFIELD, MASSACHUSETTS, ASSIGNOR TO AMERICAN CHAIN COMPANY, INC., A CORPORATION OF NEW YORK.

AUTOMOBILE FENDER GUARD.

Application filed October 5, 1925. Serial No. 60,404.

This invention relates to bumpers for automobiles, and is of special utility when embodied in the construction of so-called fender "tips" or guards, although the improvements may be used in any field for which they are adapted by their nature.

An object of the invention is to provide an automobile fender guard comprising a horizontally disposed set of impact bars in the form of extended loops, with a bracket having means to connect and support said loops in vertically spaced alignment, and with means to permit ready attachment of these assembled parts, as a unitary structure, in place upon a transverse member of an automobile frame, as for example a bar at the rear thereof.

A further object of the invention is to provide a pair of fender guard sets symmetrically formed and adapted to be disposed in opposed relation at each side of such a rear transverse frame member, with attaching portions adapted to be associated with the attaching portions of a pair of spare-tire-supports or saddles, preferably of the conventional type supplied for that purpose, so that the installation of the improved fender guards on frames already supplied with such saddles may be effected by a simple substitution of one or more standard bolts for each combined saddle part and fender-guard set, and the use of a single U-shaped attaching bolt to strengthen the attachment of the set to the transverse frame member.

No drilling or other preparation of the frame is required in such an installation, which can accordingly be made readily by the user, with tools ordinarily found in an automobile kit.

These and other features of the invention are herein described and claimed, and are illustrated in the drawings, in which Figure 1 is a plan view of the rear of an automobile equipped with a pair of fender guards embodying the invention, in combination with a pair of saddle members for a spare tire;

Fig. 2 is a rear elevation thereof; and

Fig. 3 is a fragmentary sectional view in detail on an enlarged scale, taken on the line 3—3 of Fig. 1.

In the illustrated embodiment, the part designated by the reference numeral 1 is the rear of an automobile body, having fenders 2 and a gasoline tank 3, all supported by a frame provided with springs or side members 4 and a transverse rear member 5 which is shown as taking the form of a channel bar, bolted or riveted at 6 to horns or members 7 extending toward each other from the side members 4, these parts being of usual or suitable construction, as are also, preferably, the saddle members 8 for support of a spare-tire, comprising a pair of saddle parts each having an attaching lug 9 adapted to be secured by bolts 10 and 11 to the rear member 5, one on each side of the middle thereof.

Such saddle supports for spare tires are customarily supplied as standard equipment, so that the upright web 15 of the rear frame member 5 is usually provided with bolt holes, at appropriate regions, to receive the attaching bolts 10 and 11.

In pursuance of the invention, there is provided a fender guard, or guards, preferably one for each side of the vehicle, and each comprising a horizontal set of impact bars 12 in the form of extended loops, with an attaching bracket 13 having means to connect and support the loops in vertically spaced alignment, for which purpose the bracket has a suitable body with integral horizontal ribs 14, between which are bolted firmly at 16 the inner ends 17 of the impact bars 12 while the other ends 18 of the bars are provided with eyes which are transfixed by a pivot-bolt 19 that is supported in an apertured lug 20 also formed integrally with the bracket 13.

The impact loops and their supporting bracket, thus connected, constitute a unitary fender guard structure adaptable for attachment readily to the rear member 5 of the vehicle illustrated, or to any similar vehicle frame, without drilling or other preparation of the latter.

To further such adaptation, the bracket 13 is preferably provided with lugs 21, as shown in Fig. 3 in dotted lines, extending rearwardly into position to engage the upper and lower flanges 22 of the channel bar 15, and for the purpose of securing the fender guard to the channel bar it may desirably be provided with a U-shaped bolt 23 having legs 24 passing through holes in the body of the bracket and through aligned holes in the end portions of the impact bars, being supplied with retaining nuts 25. This U- bolt serves to secure the fender guard to the transverse bar without drilling or other preparation thereof, and adjustably thereon.

As a further means for securing the fender guard in adjusted position, the bracket preferably is formed with an apertured ear 26 to be transfixed by a bolt 11 which, in the instance illustrated, is the lower of the two bolts that serve to hold the spare-tire saddle 8 in place upon the bar 5, passing through the lug 9 of the saddle part and also through the web 15 of the bar 5, to which the saddle and bracket are thereby secured in combined relation. Where the bolt 11 is long enough, it is only necessary to remove the same and reinsert it through the bracket ear 26 after the guard has been applied. The saddle part 8 is meantime held in place by the upper bolt 10, so that the attachment of the fender guards does not involve any disturbance of the saddle parts 8. If the bolt 10 originally supplied is not long enough to receive the bracket-ear 26, a simple substitution of another standard bolt of proper length is sufficient to complete the installation of each fender-guard.

Each bracket-ear 26 is preferably formed with a lug 27 to extend under the transverse frame bar 5 and aid in resisting displacement of the fender guard from its proper horizontal position, and if desired one or both of the brackets may be formed with an arm 29 extending upwardly as shown in Fig. 3 to receive and support such an attachment as a license-plate bracket 30. The bracket 13 may be provided also with strengthening ribs 31 wherever the same may be found desirable.

Having described my invention, I claim:—

1. An automobile fender-guard comprising a set of impact-bars in the form of extended loops combined with a bracket having means to connect and support said loops in vertically spaced alignment, and with means to permit ready attachment of said bracket and connected loops, as a unitary structure, to a transverse member of an automobile frame.

2. An automobile fender-guard comprising a set of impact-bars respectively having outer ends in the form of extended loops combined with a bracket having means to connect and support said loops in vertically spaced alignment, said bracket being provided with a U-bolt adapted to embrace a transverse frame member of the automobile to permit ready attachment thereto of said bracket and connected loops, as a unitary structure.

3. An automobile fender-guard comprising a set of impact-bars in the form of extended loops combined with a bracket having means to connect and support said loops in vertically spaced alignment, said bracket being provided with a U-bolt adapted to embrace a transverse frame member of the automobile to permit ready attachment thereto of said bracket and connected loops, as a unitary structure, and said bracket having also an apertured lug adapted to be bolted to said transverse frame-member at a distance from the region of attachment by said U-bolt.

4. An automobile fender-guard adapted for attachment to an automobile frame having a transverse rear frame-member provided with a spare-tire saddle-member, and means to attach said saddle-member to said rear frame-member, said fender-guard comprising an impact section combined with a bracket having means to support said impact section, and means to permit attachment of said bracket and impact section as a unitary structure to said rear frame-member by the said attaching means for said saddle-member.

5. An automobile fender-guard adapted for attachment to an automobile frame having a transverse rear frame-member provided with a spare-tire saddle-member, and means to attach said saddle-member to said rear frame-member, said fender-guard comprising an impact section combined with a bracket having means to support said impact section, and means to permit attachment of said bracket and impact section as a unitary structure to said rear frame-member by the said attaching means for said saddle-member, said bracket being provided also with a U-bolt adapted to embrace said rear frame-member at a distance from said region of attachment of said saddle-member.

6. The combination with an automobile frame having fenders, and having also a transverse rear member provided with a pair of spare-tire saddle members bolted thereto in spaced relation, of a pair of fender-guard brackets each of which supports an impact section extending into position to protect a fender, and each has an apertured lug adapted to be attached to said transverse frame member by one of the bolts securing said saddle parts thereto.

7. The combination with an automobile frame having fenders, and having also a transverse rear member provided with a pair of spare-tire saddle members bolted thereto in spaced relation, of a pair of fender-guard brackets each of which supports an impact section extending into position to protect a fender, and each has an apertured lug adapted to be attached to said transverse frame member by one of the bolts securing said saddle parts thereto said fender-guard brackets being each provided also with a U-bolt adapted to embrace said transverse frame-member at a distance from said saddle-attaching bolts respectively.

In testimony whereof, I have signed this specification.

OSCAR H. GOETZ.